...

United States Patent Office 3,373,227
Patented Mar. 12, 1968

3,373,227
POLYMERIZATION OF ABS RESINS IN THE PRESENCE OF LOW MOLECULAR WEIGHT, THERMALLY INITIATED POLYSTYRENE
Arnold B. Finestone, Leominster, Mass., and Gerald Goldberg, Parkersburg, W. Va., assignors to Foster Grant Co., Inc., Leominster, Mass., a corporation of Delaware
No Drawing. Continuation-in-part of application Ser. No. 416,645, Dec. 7, 1964. This application Apr. 24, 1967, Ser. No. 632,923
18 Claims. (Cl. 260—880)

ABSTRACT OF THE DISCLOSURE

High impact solvent resistant moldable polymers having good flow characteristics prepared by copolymerizing at least one monovinyl aromatic compound, at least one monomer, such as acrylonitrile or methacrylonitrile, at least one rubbery polymer, and a low molecular weight polystyrene prepared by thermal initiation.

---

This application is a continuation-in-part of application Ser. No. 416,645, filed Dec. 7, 1964.

This invention relates to novel high impact solvent resistant polymers having desirably high flow properties, and to a process for the production thereof. More particularly, in the novel process of this invention, a monovinyl aromatic compound and acrylonitrile or methacrylonitrile are polymerized together with a rubbery polymer in the presence of a low molecular weight polystyrene prepared by thermal initiation.

The polymers of this invention are generally termed ABS-type polymers. The term "ABS-type polymers" refers to the normally solid copolymerisates of a monovinyl aromatic compound and an organonitrile monomer containing an effective quantity of a 1,3-butadiene rubbery polymer which can be incorporated into the copolymer by post blending or by addition to the copolymerization mixture. Such polymeric compositions are characterized by having markedly high impact values, resistance to organic solvents and high tensile and flexural strengths. It is known that homopolymers of styrene without added rubber have comparatively low impact values and have low resistances to many organic solvents and that styrene-acrylonitrile copolymers have resistance to solvents but have only slightly better impact strength than polystyrene.

ABS-type polymers may be produced by forming a styrene-acrylonitrile copolymer having about 60–80% by weight of styrene and about 20 to 40% by weight of acrylonitrile and adding thereto a suitable rubbery polymer containing butadiene, such as butadiene-acrylonitrile rubber, to form a physical blend. ABS-type polymers may also be formed by a polymerization process in which a rubbery polymer of butadiene, such as polybutadiene, butadiene-styrene copolymer, butadiene-acrylonitrile copolymer, or the like, are dissolved in a mixture of monomers, such as a mixture of styrene and acrylonitrile, and subjecting the resulting solution to appropriate polymerization conditions to form the high impact solvent resistant polymer compositions identified herein as ABS-type polymers. Likewise, ABS-type polymers may be produced by polymerization of appropriate mixtures of butadiene rubber latices and the above monomer mixtures.

The herein described invention provides a novel process for the production of novel ABS-type polymers having the qualities described above of desirably high impact values, solvent resistance, high tensile and flexural properties, as well as the desired good flow properties required to fabricate such polymers into usable parts by the use of conventional forming machines and techniques. Also, this invention provides novel ABS-type polymers with the desired properties.

One modification of this invention which provides a novel method of producing high impact solvent resistant polymers having good flow properties, comprises polymerizing a mixture of about 60 to about 80 parts by weight of at least one monovinyl aromatic compound; about 20 to about 40 parts by weight of at least one monomer of the formula:

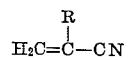

wherein R represents a member of the group consisting of hydrogen and methyl; about 5 to about 30 parts by weight of a butadiene rubbery polymer; and about 0.25 to about 10%, based on the total final polymer weight of a normally solid low molecular weight polystyrene prepared by thermal initiation, which has an average molecular weight of up to about 35,000.

The process of this invention may be carried out by aqueous suspension polymerization or by aqueous emulsion polymerization. However, aqueous suspension polymerization is preferred. It is especially preferred to prepolymerize in bulk to a minor extent, such as from about 2 to about 30% monomer conversion, and then to complete the polymerization in suspension. The polymerization may be thermally initiated or a catalytic initiator may be used. The temperature conditions of the polymerization depend upon a number of factors, such as the type of initiation, monomer ratios, the rubbery polymer used, the polymerization additives, and the like. The low molecular weight polystyrene may be added either prior to any polymerization, which is preferred, or at an early stage of the polymerization. All the low molecular weight polystyrene may be added to the original polymerization mixture or may be added to the polymerization mixture during an early stage of the polymerization either as a single addition or in increments. Addition of the low molecular weight polystyrene in this manner produces the desired rather than the deleterious effect brought about by adding the low molecular weight polystyrene to the polymer and mechanically blending the mixture, as demonstrated in the examples below.

A suitable low molecular weight polystyrene is a normally solid polystyrene which has been prepared by thermal initiation and which has an average molecular weight of up to about 35,000. The preferred molecular weight range is from about 2,000 to about 25,000. It has been found that good results are obtained when the concentration of the low molecular weight polystyrene in the polymer is from about 0.25 to about 10% by weight, the preferred range being from about 0.5 to about 6% by weight, based on the total final polymer weight.

An ABS-type polymer having the desired flow characteristics is obtained by the addition of the low molecular weight polystyrene in the manner hereinabove mentioned. Such desired flow properties are readily apparent when strands of polymers which contain low molecular weight polystyrene and polymers which do not contain low molecular weight polystyrene are prepared by extrusion and compared. A smooth extruded strand is indicative of good flow properties. Flow properties can be readily determined on a quantitative basis by ASTM (American Standards for Testing Materials) procedure D1238–57T. The amount of lowering of the relative viscosity of a polymer containing a low molecular weight polystyrene below that of a control run containing no low molecular weight polystyrene is a measure of the enhancement of flow of a polymer composition. Rheometers providing for temperature and shear rate controls can be satisfactorily employed for flow evaluation. Lower viscosity materials exhibit better flow properties. The polymers of this invention are intended to be used in conventional molding procedures, such as injection and extrusion molding and must have sufficient structural strength to lend strength to articles molded therefrom.

Suitable rubbery polymers are rubbery polymeric derivatives of 1,3-butadiene, such as homopolymers thereof and rubbery copolymers, such as butadiene-styrene, butadiene-acrylonitrile, or butadiene - methacrylonitrile copolymers, rubbery terpolymers, such as butadiene-styrene-acrylonitrile, or butadiene-styrene-methacrylonitrile terpolymers, hot and cold emulsion polybutadienes, stereoregular polybutadienes having a cis content of at least 25% and a vinyl content of less than about 10%, and the like, and mixtures thereof.

The monovinyl aromatic compounds which may be used include styrene, alpha-methylstyrene, vinylnaphthalene, and derivatives thereof that are free from nuclear substituents which interfere with the production of the desired ABS-type polymers of this invention. Specific examples of such monovinyl aromatic compounds include para-methylstyrene, meta - methylstyrene, para - ethylstyrene, para-isopropylstyrene, ortho - chlorostyrene, para-chlorostyrene, aryl-dimethylstyrene, aryl-dichlorostyrene, aryl-methyl-aryl-ethylstyrene, aryl-methyl-aryl - chlorostyrene, aryl - diethylstyrene, para - fluorostyrene, para-bromostyrene, and aryl-methyl-aryl isopropylstyrene. The preferred vinyl aromatic compound is styrene.

When thermal initiation is used, the polymerization temperature is from about 80° to about 130° C. and the time of polymerization is about 1 to about 20 hours. When a free radical catalyst is used, the temperature and time of the polymerization is substantially the same and about 0.03 to 1% of catalyst, based on the weight of the monomers, is used. When aqueous emulsion polymerization is used, conventional initiators, such as hydrogen peroxide, ammonium persulfate, potassium persulfate, sodium perborate, and the like, may be used. When aqueous suspension polymerization is used, suitable free radical initiators, preferably monomer soluble initiators which have suitable decomposition ranges, may be employed. Peroxide initiators have been found to be particularly suitable. Several classes of peroxide initiators may be employed, such as benzoyl peroxide, chlorobenzoyl peroxide, bromobenzoyl peroxide, fluorobenzoyl peroxide, naphthal peroxide, lauroyl peroxide, myristyl peroxide, stearyl peroxide, di-tertiary-butyl peroxide, hydrogen peroxide, decanoyl peroxide, para-methane hydroperoxide, and the like, or combinations thereof. Also, suitable azo catalysts may be used, either alone or in combination with other catalysts. A suitable azo catalyst is azo-bisisobutyronitrile.

It is also contemplated that small quantities of other comonomers may be present in the polymerization reaction mixture as long as they do not substantially detract from the desired polymer properties.

It is preferred to use molecular weight modifiers in the polymerization process of this invention. Suitable molecular weight modifiers are unsaturated alpha-methylstyrene dimers and mercaptan modifiers, such as alkyl or aryl mercaptans having 3 to 16 carbon atoms, more particularly, dodecyl mercaptan and tertiary dodecyl mercaptan, 1-phenyl-butene-2, fluorene, dipentene, and the like. These molecular weight modifiers may be employed generally in amounts of at least about 0.03%, preferably up to about 0.5%, based on the total weight of monomer-rubbery material. Alpha-methylstyrene dimers are prepared by the reaction of two molecules of a substituted or unsubstituted alpha-methylstyrene. A combination of 2,4-diphenyl-4-methyl-2-pentene and 2,4-diphenyl-4-methyl-1-pentene is obtained by the dimerization of unsubstituted alpha-methylstyrene.

When suspension polymerization is employed, suspending agents, such as polyvinyl alcohol, hydroxyethyl cellulose, ammonium polyacrylate, hydroxy-apatite, bentonite, and the like, may be used alone or in combination.

Surfactants are required in emulsion polymerization in accordance with conventional emulsion polymerization methods and may also be used in suspension polymerization. Suitable anionic surface active agents for use in suspension polymerization include fatty acid surfactants, aromatic carboxylic acid surfactants, aromatic and aliphatic organic sulfates and sulfonates, such as sodium and potassium beta-naphthalene sulfonates, sodium and potassium dodecylbenzene sulfonates, sodium and potassium stearates, sodium and potassium caprolates, sodium and potassium lauryl sulfates, and the like. Any effective small amount of the anionic surfactant may be used, ordinarily about 0.002 to about 0.06% of anionic surfactant, based on the weight of the water of the polymerization mixture, is sufficient. Conventional emulsifying agents and methods can be employed in carrying out aqueous emulsion polymerizations in accordance with the process of this invention.

The following procedure is used to produce low molecular weight polystyrene by thermal initiation: Styrene monomer is passed continuously through a jacketed column and maintained under a pressure of nitrogen of 45 pounds per square inch. The upper zone of the column, which acts as a reflux condenser, is jacketed separately and maintained at 20° C. by passing cold water through the jacket. The reaction zone is just below the cooled upper zone and is jacketed separately and heated by passing steam through the jacket so that the temperature of the polymerization mixture is maintained at 205° to 215° C. at the top and at 245° to 255° C. at the bottom thereof. At these pressure and temperature conditions, refluxing of styrene monomer takes place. A considerable amount of heat of reaction is removed by reflux. The low molecular weight polystyrene is continuously withdrawn from the bottom of the column and cooled. The amount of styrene monomer continuously added at the top of the column and the amount of polymer withdrawn from the bottom of the column is adjusted so that the residence time in the column is about two and one-half hours. The low molecular weight polystyrene prepared in this manner has an average molecular weight of about 18,000 and a monomer content of 0.13 to 0.82% by weight.

The following examples illustrate specific embodiments of the invention. The term "parts" as used in the examples means "parts by weight," unless otherwise stated. Percentages set out in the examples are percentages by weight, based on the total charge, unless otherwise stated.

In Examples 1 to 8, the concentration of the low molecular weight polystyrene prepared by thermal initiation (LMWP), which has an average molecular weight of 20,000, is varied from 0 to 10% by weight of the resultant polymer product. The results of Examples 1 to 8 are given in Table A.

In Examples 1 to 8, a first step is the preparation of a prepolymer. The following ingredients of the prepolymer charge are introduced into a reactor fitted with a condenser, nitrogen inlet, stirrer and thermometer:

| | Parts |
|---|---|
| SBR Rubber (sold by Goodyear Tire & Rubber Co., Inc. as SBR 1006 and having 24% styrene and 76% butadiene) | 14.9 |
| Styrene | 64.6 |
| Acrylonitrile | 20.3 |
| Antioxidant | 0.2 |

Alpha-methylstyrene dimers (AMSD) are added in the amounts given in Table A.

The prepolymer reaction mixture is stirred for 6 hours at 25° C. and then allowed to stand for about 16 hours under a nitrogen atmosphere. After standing, the reaction mixture is heated to 90° C. and maintained at that temperature for 6 hours with stirring under a nitrogen atmosphere and then cooled to room temperature.

The second step of Examples 1 to 8 is a suspension polymerization. The suspension charge is made up of the following ingredients which are introduced into a reactor fitted with a condenser, nitrogen inlet, stirrer and thermometer:

| | Parts |
|---|---|
| Acrylonitrile | 2.3 |
| Polyvinyl alcohol suspending agent (a high viscosity polyvinyl alcohol sold as ELVANOL Grade 50–42 by E. I. du Pont de Nemours & Company, Incorporated) | 0.4 |
| Lauroyl peroxide | 1.3 |
| Sodium chloride | 0.7 |
| Water | 64.7 |
| Prepolymer prepared as above | 31.8 |

The low molecular weight polystryene prepared by thermal initiation is added in the amounts given in Table A.

The contents of the reactor are heated at 75° C. with stirring for 5 hours. After this period, the reaction mixture is cooled to 35° C. The polymer beads are separated by filtration, washed thoroughly with water, and dried at 75° C. until volatiles are below 1%.

The resultant polymers are extruded by a laboratory extruder into strands. Apparent viscosities of the extruded strands are measured by using an Instron Rheometer at 450° F. using a Length to Diameter ratio of 33.3 and a shear rate of 85.9 sec.$^{-1}$. The results of Examples 1–8 are given Table A.

TABLE A

| Example | LMWP (wt. percent) | AMSD (wt. percent) | Apparent Viscosity, ×10³ poises |
|---|---|---|---|
| 1 | | | 30.9 |
| 2 | | | 29.9 |
| 3 | 10 | | 23.4 |
| 4 | 2 | 0.2 | 24.0 |
| 5 | 5 | 0.2 | 22.1 |
| 6 | | 0.2 | 29.0 |
| 7 | | 0.4 | 22.5 |
| 8 | | 0.6 | 19.4 |

It is apparent from the results presented in Table A that low molecular weight polystryene prepared by thermal initiation lowers apparent viscosity and that 5% of low molecular weight polystryene prepared by thermal initiation produces a viscosity reduction similar to that produced by 0.2% of alpha-methlstyrene dimers.

Examples 2 and 3 are repeated except that the low molecular weight polystryene prepared by thermal initiation is blended into the polymer by mechanical means after polymerization is complete and the blends are extruded. The extruded strands have very rough corrugated surfaces and weak spots, so that the strands readily break into many parts.

Example 3 is repeated by the low molecular weight polystryene prepared by thermal initiation is replaced by low molecular weight polystryene prepared by catalytic initiation according to the following procedure: 3731 ml. of water in a flask equipped with a stirrer, thermometer and reflux condenser are heated to 88° C. 1259 ml. of styrene and 50 grams of benzoyl peroxide are added and the temperature of the reaction mixture is brought to 90° C. and maintained at that temperature for 11½ hours. Throughout the periods of addition and heating, the reaction mixture is stirred continually. At the end of the heating period, the contents of the flask are cooled to room temperature and then filtered. The polystyrene beads are washed with water and dried. The low molecular weight polystyrene has an average molecular weight of about 20,000.

The polymer produced by this example is extruded by a laboratory extruder into strands. The extruded strands have very rough corrugated surfaces and have weak spots so that they break easily into many parts. The polymer is insoluble in cyclohexanane which indicates a high degree of cross-linking.

In Examples 9 to 13, the procedure of Examples 1 to 8 is followed. The polymer and suspension charges of Examples 9 to 13 are given below.

Low molecular weight polystryene prepared by thermal initiation, which has an average mol. wt. of 20,000 is not added in Example 9, is added to the prepolymer charge of Examples 10 and 12, and is added to the suspension charge of Examples 11 and 13. The quantities added are given in Table B.

| Prepolymer charge: | Parts |
|---|---|
| SBR Rubber (rubber product employed in Examples 1–8) | 10 |
| Styrene | 68.4 |
| Acrylonitrile | 21.6 |
| Lauroyl peroxide | 1.1 |
| Antioxidant | 0.2 |
| Alpha-methylstyrene dimers | 0.2 |

| Suspension charge: | Parts |
|---|---|
| Acrylonitrile | 4.68 |
| Polyvinyl alcohol suspending agent (ELVANOL 50–42) | 0.1 |
| Lauroyl peroxide | 0.85 |
| Sodium chloride | 0.65 |
| Water | 130 |
| Prepolymer prepared as above | 65 |

The polymers prepared according to Examples 9 to 13 are extruded by a laboratory extruder and pelletized. Relative viscosities of the polymers of the pellets are measured at 25° C. by the use of a solution of 0.5000 gram of polymer in 50 milliliters of cyclohexanone.

TABLE B

| Ex. | LMWP (wt. percent) | LMWP added to— | Relative Viscosity | Appearance of Extruded Strand |
|---|---|---|---|---|
| 9 | 0 | None added | 2.62 | Fair. |
| 10 | 2 | Prepolymer | 2.46 | Fair-good. |
| 11 | 2 | Suspension | 2.58 | Do. |
| 12 | 5 | Prepolymer | 2.34 | Good. |
| 13 | 5 | Suspension | 2.42 | Do. |

The reduced relative viscosities and improved extrusion behavior provided by the process of this invention are evident from the results of the examples which show that the addition of LMWP into the prepolymer charge is more effective than addition to the suspension polymerization charge.

Examples 1 to 13 are repeated but the SBR rubber is replaced with an equal quantity of a stereoregular polybutadiene having 2.7% of 1,2 addition content and about 95% of cis content and with a stereoregular polybutadiene having about 8% of 1,2 addition content and about 35% of cis content. The high impact solvent resistant polymers of these examples have reduced viscosities similar to the reduced viscosities of the polymers of Examples 1 to 13.

Examples 1 to 13 are repeated but dodecyl mercaptan and equimolar amounts of methacrylonitrile are used instead of alpha-methylstyrene dimers and acrylonitrile.

The high impact solvent resistant polymers of these examples have reduced viscosities similar to the reduced viscosities of the polymers of Examples 1 to 13.

It will be apparent that many changes and modifications may be made in the products and processes set forth above without departing from the spirit and scope of this invention.

What is claimed is:

1. A method of producing a high impact solvent-resistant moldable polymer having good flow, which comprises polymerizing a mixture of about 60 to about 80 parts by weight of at least one monovinyl aromatic compound, about 20 to about 40 parts by weight of at least one organonitrile of the following formula:

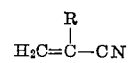

wherein R represents a member of the group consisting of hydrogen and methyl, from about 5 to about 30 parts by weight of a rubbery polymer selected from the group consisting of a polymer of 1,3-butadiene and copolymers thereof, and an effective amount of about 0.25 to about 10% by weight, based on the total weight of the final polymer, of a normally solid low molecular weight polystyrene prepared by thermal initiation and having an average molecular weight of up to about 35,000.

2. A method according to claim 1 in which the monovinyl aromatic compound is styrene and the organonitrile is acrylonitrile.

3. A method according to claim 1 in which the monovinyl aromatic compound is styrene and the organonitrile is methacrylonitrile.

4. A method according to claim 1 in which the monovinyl aromatic compound is styrene and is present in an amount of about 75 parts by weight, the organonitrile is acrylonitrile and is present in an amount of about 25 parts by weight, the low molecular weight polystyrene has an average molecular weight of from about 2,000 to about 25,000 and is present in an amount of about 0.5 to about 6% by weight, based on the total weight of the final polymer.

5. A method according to claim 1 in which the low molecular weight polystyrene has an average molecular weight of about 2,0000 to about 25,000 and is present in an amount of about 0.5 to about 6% by weight, based on the total weight of the final polymer.

6. A method according to claim 1 in which the rubbery polymer is polybutadiene.

7. A method according to claim 1 in which the rubbery polymer is a butadiene-styrene copolymer.

8. A method according to claim 1 in which the rubbery polymer is a stereoregular polybutadiene having at least a 25% cis content and a vinyl content of less than about 10%.

9. A method according to claim 1 in which the low molecular weight polystyrene has an average molecular weight of about 2,000 to about 25,000 and is present in an amount of about 0.5 to about 6% by weight, based on the total weight of the final polymer.

10. A method according to claim 1 in which an effective amount of a molecular weight modifier is present in the polymerization mixture.

11. A method according to claim 10 wherein the molecular weight modifier is a mercaptan type modifier.

12. A method according to claim 10 wherein the molecular weight modifier is an allylic type modifier.

13. A method according to claim 10 wherein the molecular weight modifier is an unsaturated alpha-methylstyrene dimer.

14. A high impact solvent resistant moldable polymer having good flow, which is a copolymerization product of about 60 to about 80 parts by weight of at least one monovinyl aromatic compound, about 20 to about 40 parts by weight of at least one organonitrile of the following formula:

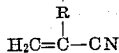

wherein R represents a member of the group consisting of hydrogen and methyl, about 5 to about 30 parts by weight of rubbery polymer selected from the group consisting of a polymer of 1,3 butadiene and copolymers thereof, and an effective amount of about 0.25 to about 10% by weight, based on the total final polymer weight, of a normally solid low molecular weight polystyrene prepared by thermal initiation and having an average molecular weight of up to about 35,000.

15. A polymer according to claim 14 in which the monovinyl aromatic compound is styrene and the organonitrile is acrylonitrile.

16. A polymer according to claim 14 in which the monovinyl aromatic compound is styrene and the organonitrile is methacrylonitrile.

17. A polymer according to claim 14 wherein the rubbery polymer is a butadiene-styrene copolymer.

18. A polymer according to claim 14 wherein the rubbery polymer is polybutadiene.

References Cited

UNITED STATES PATENTS

| | | | |
|---|---|---|---|
| 2,913,426 | 11/1959 | Li et al. | 260—880 |
| 3,193,518 | 7/1965 | Lunk | 260—880 |
| 3,311,675 | 3/1967 | Doak et al. | 260—880 |
| 3,330,786 | 7/1967 | Finestone et al. | 260—880 |

FOREIGN PATENTS 584,238   9/1959   Great Britain.

MURRAY TILLMAN, *Primary Examiner.*

J. T. GOOLKASIAN, *Assistant Examiner.*